Figure 1:
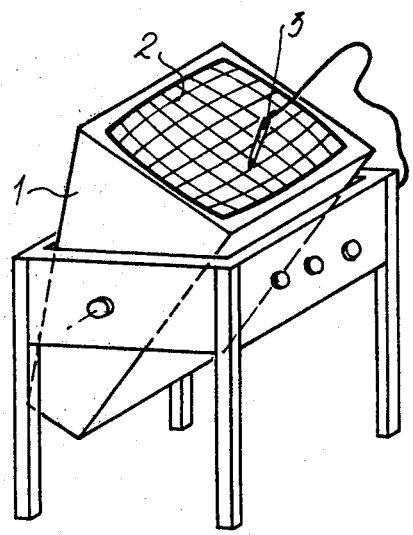

United States Patent [19]
Dagnelie et al.

[11] 4,361,725
[45] Nov. 30, 1982

[54] TELETEXT AND DISPLAY APPARATUS FOR GENERAL SURFACE

[76] Inventors: Jean-Paul Dagnelie, 7 Quai de la Prevalaye, 35000 Rennes; Robert Veilex, Domaine des Bois de Jarcy-F-91480 Varennes Jarcy, Quincy-sous-Senart; Jean-Claude Rahuel, 12 Square de Tanouarn, F-35000 Rennes, all of France

[21] Appl. No.: 234,775

[22] Filed: Feb. 17, 1981

[30] Foreign Application Priority Data

Feb. 21, 1980 [FR] France .............................. 80 04122

[51] Int. Cl.³ ............................................ G08C 21/00
[52] U.S. Cl. ........................................................ 178/19
[58] Field of Search ............ 178/18, 19; 340/347 AD, 340/146.35 Y, 706, 707, 712, 717, 718, 719, 721, 723, 732; 35/8, 9

[56] References Cited

U.S. PATENT DOCUMENTS

| | | | |
|---|---|---|---|
| 3,671,668 | 6/1972 | Reiffel ................................... | 178/19 |
| 3,758,718 | 9/1973 | Fletcher et al. . | |
| 4,066,855 | 1/1978 | Zenk . | |
| 4,220,815 | 9/1980 | Gibson et al. .......................... | 178/18 |
| 4,225,750 | 9/1980 | Rahuel et al. .......................... | 178/19 |

FOREIGN PATENT DOCUMENTS

65252 4/1972 Fed. Rep. of Germany .

OTHER PUBLICATIONS

IBM Technical Disclosure Bulletin, vol. 22, No. 8B, Jan. 1980, "Computer Interface Device", pp. 3542-3543.
Control Engineering, vol. 23, No. 7, Jul. 1976, "CRT Touch Panels Provide Maximum Flexibility in Computer Interaction", pp. 33-34.
IBM Technical Disclosure Bulletin, vol. 17, No. 3, Aug. 1974, "Position Transducing Tablet", pp. 748-749.

*Primary Examiner*—Thomas A. Robinson
*Attorney, Agent, or Firm*—Laff, Whitesel, Conte & Saret

[57] ABSTRACT

The apparatus comprises a wire sheet graphics tablet and a display apparatus, particularly a cathode ray tube, for receiving the signals transmitted by the graphics tablet. Alternating current flows through wires (5,6) of the tablet. The non-conducting plate (4) of the tablet is transparent and the wire sheets (5,6) are made up of transparent electrical conductors or of small conducting wires, which makes them practically invisible. The tablet is placed on the screen of the display apparatus. Between the screen of the cathode ray tube and the lower side of the graphics tablet, a transparent conducting and non-magnetic coating (8) is provided. In one variation, the current flowing through the layers of wire (5,6) is a high frequency current. The pen for the graphics tablet may be a metallic rod covered by a sheath of insulating material.

6 Claims, 4 Drawing Figures

TELETEXT AND DISPLAY APPARATUS FOR GENERAL SURFACE

The present invention relates to teletext and display equipment for general surfaces, comprised of wire sheaths and display apparatus, such as cathode ray tubes, for receiving the signals transmitted by the graphics tablets.

One known technique for directly writing on a screen uses a light pen. It is based on the use of a cathode ray tube and thus cannot be used for matrix type flat screens (liquid crystals, plasmas, electro-luminescent powders, etc.). The light pen technique is based on the synchronous detection by a photodiode of the electron beam sweeping the cathode tube. By construction, the system allows the acquisition of only one position of the light pen every half picture, which impedes the detection of rapid small movements and thus requires a very low writing speed. For example, the system cannot be used to acquire the fine details of a signature.

Graphics tablets with wire sheets are known. A wire graphics tablet includes a non-conducting plate having two sheets of wires, the wires being perpendicularly oriented and all insulated from one another. The wires in one sheet are sequentially energized by an electric current, then the wires in the next sheet, and so on. A type of pen or ball point pen enables one to write or draw on a sheet of paper covering the non-conducting plate. The pen is sensitive to the electric field created by the currents passing in the wires and yields an output signal from which the coordinates of the tip of the pen are determined. The signal thus recovered is used to display, for example, on a cathode ray tube the writing or the drawing executed on the graphics tablet. The tablet may thus be used to acquire in real time a drawing or script, to generate the signal and to transfer the information to a visualizing apparatus displaying the writing or drawing on a screen, for example the screen of a cathode ray tube.

The greatest inconvenience of this teletext system is that the writing surface is separate from the display or visualizing surface.

More or less transparent conducting gratings mounted on flexible transparencies are also known which are applied on display screens which display predetermined drawings. These gratings are associated with means which allow the selection of one crossover point among the crossover points of the grating in order to control the controllable component in the display drawing under the selected crossover point. Gratings of this type are described in the Luxemberg Pat. No. 65,252, U.S. Pat. Nos. 3,758,718 and 4,066,855, and also in the publication of K. Crook entitled "CRT TOUCH PANELS PROVIDE MAXIMUM FLEXIBILITY IN COMPUTER INTERACTION" and published in the technical journal CONTROL ENGINEERING, Vol. 23, No. 7, pages 33 and 34, July 1976 or also in the publication of J. P. Kennedy entitled "COMPUTER INTERFACE DEVICE" published in the IBM TECHNICAL DISCLOSURE BULLETIN, Vol. 22, No. 8B, pages 3542 and 3543, January, 1980. In practice, these gratings are not graphics tablets as they allow only the selection of one crossover point, while a graphics tablet must allow real time drawing with a display apparatus.

One object of the present invention is to provide a teletext and display apparatus for general surfaces including a graphics tablet with transparent wires and not necessarily flat in order to match the writing surface with the surface of a cathode ray tube receiving the signals transmitted by the tablet.

Some experiments have indicated that coupling exists between the display tube and the pen of the tablet. To remedy this inconvenience, which renders a drawing useless, it is sufficient, in the present state of the art to separate the screen and the pen by about 1 meter. We must note that with crossover point selection gratings, we do not have this type of interference.

Another object of the present invention is to provide means for superposition of a transparent graphics tablet onto the screen of a cathode ray tube.

According to one characteristic of the invention, a teletext and display apparatus is provided, as described above, including a graphics tablet with wires energized by alternating currents. The wires are on a transparent non-conducting plate and the wire sheaths are perpendicularly oriented with one another. The sheets are made up of transparent electrical conductors or of small electrical wires, which makes them practically invisible. The tablet is applied onto the screen of the cathode ray tube and associated with means to detect the electric field created by the alternating currents in order to deduce display signals which are, among other things, transmitted to the said display tube. Between the screen of the cathode ray tube and the bottom side of the graphics tablet is a transparent non-magnetic conducting coating.

In accordance with another characteristic, the electric current energizing the sheets of wires is a high frequency current, for example, of the order of 10 MHz.

Figure 2:
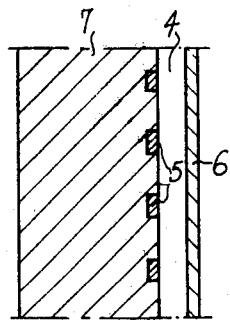
Figure 3:
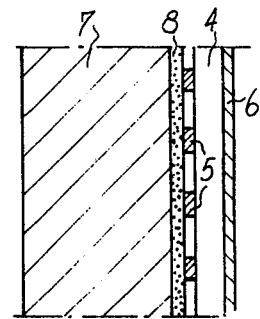
Figure 4:
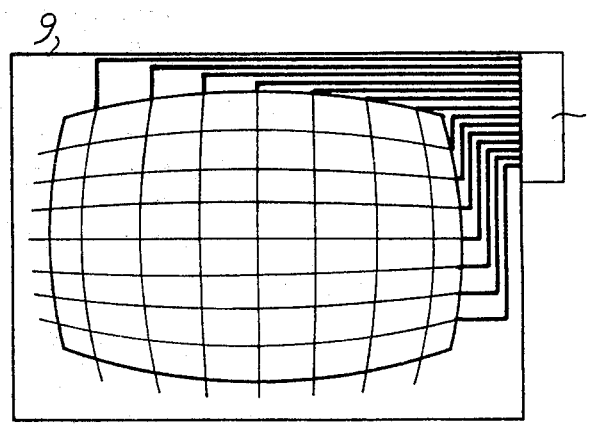

The characteristics of the above mentioned invention, as well as others, will become clearer after reading the following description of embodiments, the description being made with reference to the adjoining figures, among which:

FIG. 1 is a schematic view of writing and display apparatus according to the invention, FIG. 2 is a cross-sectional view of a transparent tablet according to the invention, applied on the screen of a cathode ray tube, FIG. 3 is a cross-sectional view of one variation of the tablet of FIG. 2, applied on the screen of a cathode ray tube, and FIG. 4 is a view of one tablet surrounded by a frame.

In FIG. 1, we have shown a cathode ray tube apparatus 1 operating as a television receiver, on the screen of which is a transparent graphics tablet 2. The pen 3 associated with the tablet is connected to a transmission circuit, which is itself connected to a reception circuit which energizes the receiver of apparatus 1.

It should be noted that, to use the invention, it is not necessary to use a pen leaving a written trace. A pen, in the original sense of the term is sufficient. This pen may even be a simple metal rod with an insulating sheath and a rounded tip.

On the screen of the cathode ray tube, is displayed the drawing executed by the pen 3 on tablet 2. The transmission from the pen to the apparatus being instantaneous, the operator has the feeling of writing directly on the screen of the tube which is visible through the tablet. This is why we can simply use, as pen, a metal rod sheathed by an insulator. In other respects, if the receiver of the apparatus may receive signals coming from other tablets, the operator may participate directly in a conference.

On the section of FIG. 2, we have shown a layer 4 with, on one side, horizontal conductors 5, and on the other side, vertical conductors, such as 6. The material of layer 4 is transparent, insulating, but allows the passage of magnetic fields. Among the materials that could be used to make up layer 4, glass can be noted.

The conductors 5 and 6 are transparent conducting strips, of negligible resistance.

To obtain these conducting strips, many techniques are known, such as, for example:

cathodic vaporization of a transparent conducting layer of a mixture of oxides of tin and indium (Indium Tin Oxide-ITO), the use of the PYROSOL procedure, developed at the Commissariat a L'Energie Atomique, applies transparent conductors to a coating a fabrication of transparent indium oxide conducting films, according to a process described in the American technical journal "JOURNAL OF VACUUM SCIENCE TECHNOLOGY", Vol. 12, No. 1, January, 1975, deposits of fluoride doped $SnO_2$ on Triplex glass according to a process developed by the Societe Saint-Gobain, deposits of $In_2O_2$ on glass according to a process developed by the Societe Protis.

It is also possible to replace the conducting deposits by very fine wires, for example metallic wires, with negligible resistance for example a few hundredths of a mm in diameter. These wires may be either glued to a transparent substrate or immersed in it. The small size of these wires makes them almost invisible, thus the transparency of the wire tablet.

It is clear that from the moment we know how to lay conductors or glue wires of the layers of the active portion of a wire tablet, we can easily realize these layers on non-flat surfaces.

Similarly, the active part of the wire tablet may be realized on a flexible support. In this case, the non-conducting, transparent substrate which is permeable to electromagnetic fields must be flexible. The respective elasticity coefficients of the substrate and the material of the conductive layers must be chosen so that the deformation of the substrate does not break the conductors.

In the example shown in FIG. 2, the electrical current passing in conductors 5 and 6 is a high frequency current of the order of 10 MHz. In the application for the French Pat. No. 77 39395, a graphics tablet is described for which the layers are energized by currents having frequencies of the order of 10 MHz, the searching frequency for the wires of the sheet being in the order of one hundred kilohertz. (The frequencies taught by this French Pat. No. 77 39395 are applied through a box 10 (FIG. 4)). Notwithstanding the advantages already obtained by using this tablet with a high frequency current, it has been observed that, if we apply such a tablet to the screen 7 of a television which receives the signals collected by the pencil of the tablet, the disturbances mentioned above do not exist anymore. That is, the illuminated spot on the screen follows the position of the pencil on the tablet.

On the section of FIG. 3, we find layer 4, having its sheets of conductors 5 and 6, placed against the front lining 7 of the television tube. Between the layer 4 and the surface of lining 7, a very thin layer 8 of non-magnetic material is provided, which layer may be a metal or a metallic oxide conductor similar to the material used for the realization of the conducting bands. The thickness of film 8 is small enough so that it appears transparent. The film 8 which makes up a continuous metallic surface is electrically connected to ground. In this variation we can use low frequency currents in the sheets of the tablet. In fact, the film 8 is a decoupling screen between the current of the tablet and the electron beam of the tube.

In the preceding examples, a layer 4 is provided between the two conducting sheets 5 and 6. However, this layer carries out two functions, that is to be a material support for the sheets and to insulate them. It appears that if enamelled wires are used the layers may be omitted as support and the face of the television tube may be used, to support the wires directly. The wires may be fixed to the tube with transparent glue. The positioning of the wires on the tube can be improved by providing small grooves defining their lateral position. Of course, a conducting layer under the wires, such as, 8, FIG. 3, can be provided.

In the preceding examples, a cathode ray tube screen can be used as display apparatus. It should be well understood that the transparent graphics wire tablets, in accordance with the invention, may equally well be applied to other types of display apparatus.

It is of course necessary to connect the ends of the wires making up the sheets to the current sources to carry out the search of the writing surface, for example as described in the French Pat. No. 77 39395. Thus, we provide around the tablet's writing surface, a frame made of insulating material in which the end of each wire is connected to an electronic switch set in the frame or to a connection terminal carried by the frame. The energizing and control currents being large in number, it is advantageous, in order to reduce the number of connections, to provide an address decoder set directly in the frame near the switches.

FIG. 4 illustrates a tablet provided with a frame 9 that surrounds the tube screen. On the table, the wire sheets are set so that the parallax error due to the tube is corrected. The end of each wire is extended on the frame 9 to a switch 10, which in the described example can satisfy 70 connections. To simplify the embodiment, many connectors can be provided, instead of a single one.

The embodiments of the invention in which an exclusive property or privilege is claimed are defined as follows:

1. A teletext and display apparatus comprising a pair of wire sheet means forming an orthogonal array of conductors, display means for supporting said wire sheet means in front of a display area and being operated responsive to signals from said array of conductors, transparent insulating means separating said pair of wire sheet means, whereby said wire sheet means forms a graphics tablet in front of said display area, means for energizing said wires with an alternating current, and a transparent non-magnetic conductive layer interposed between said graphics tablet and said display area.

2. The apparatus of claim 1 wherein said display means is a cathode ray tube and said display area is the face of said cathode ray tube.

3. The apparatus of claim 1 wherein said alternating current is a high frequency current.

4. A teletext graphic tablet and display apparatus sharing a common surface whereby any writing on said tablet overlaps a display by said apparatus, said graphic tablet comprising an orthogonal array of conductors which are electrically insulated from each other by a transparent means, means for energizing said wires with a high frequency alternating current, and a non-magnetic conductive layer between said array of conductors and said display apparatus.

5. The apparatus of claim 3 or claim 4 wherein said high frequency is in the order of 10 MHz.

6. The apparatus of any of the claims 1-4 and a pen for writing on said graphic tablet, said pen comprising a metallic rod having an insulating sheath.

* * * * *